United States Patent
Zaimis et al.

[15] 3,666,861
[45] May 30, 1972

[54] METHODS FOR TREATING MIGRAINE WHICH USE 2-(2',6'-DICHLOROPHENYL-AMINO)-1,3-DISZACYCLOPENTENE-(2)

[72] Inventors: Eleanor Zaimis; Edda Hanington, both of London, England

[73] Assignee: Bochringer Ingelheim GmbH, Ingelheim/Rhine, Germany

[22] Filed: June 3, 1970

[21] Appl. No.: 43,197

[30] Foreign Application Priority Data
June 6, 1969 Germany..................P 19 28 798.0

[52] U.S. Cl............................................424/273
[51] Int. Cl. ........................................A61k 27/00

[58] Field of Search................................424/273; 260/309.6

[56] References Cited

UNITED STATES PATENTS 3,236,857  2/1966  Zeile et al...............................424/274

*Primary Examiner*—Stanley J. Friedman
*Attorney*—Hammond and Littell

[57] ABSTRACT

Pharmaceutical compositions for the treatment of the syndrome known as hemicrania or migraine, comprising 2-(2',6'-dichlorophenyl-amino)-1,3-diazacyclopentene-(2) or a non-toxic acid addition salt thereof as an active ingredient; and a method of treating hemicrania or migraine in humans with such compositions.

4 Claims, No Drawings

METHODS FOR TREATING MIGRAINE WHICH USE 2-(2',6'-DICHLOROPHENYL-AMINO)-1,3-DISZACYCLOPENTENE-(2)

This invention relates to pharmaceutical compositions containing 2-(2',6'-dichlorophenyl-amino)-1,3-diazacyclopentene-(2) or a non-toxic acid addition salt thereof as an active ingredient, as well as to a method of treating hemicrania or migraine in humans therewith.

More particularly, the present invention relates to the treatment of hemicrania or migraine in humans, using 2-(2',6'-dichlorophenyl-amino)-1,3-diazacyclopentene-(2) of the formula

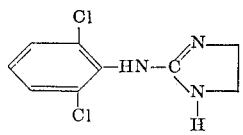

or a non-toxic, pharmaceutically acceptable acid addition salt thereof.

BACKGROUND OF THE INVENTION

It is well known that 2-(2',6'-dichlorophenylamino)-1,3-diazacyclopentene-(2) and its non-toxic acid addition salts possess useful pharmacodynamic properties, among which the hypotensive activity is particularly prominent. In addition, these compounds exhibit vasoconstricting, decongestive, stomach juice secretion inhibiting, and sedative side-effects.

Practical experience over several years has shown that, for achievement of a clearly discernable and long-lasting reduction of the blood pressure in humans, a dosage of at least 75 micrograms of 2-(2',6'-dichlorophenyl-amino)-1,3-diazacyclopentene-(2) or a salt thereof is required. This minimum dosage, however, is not sufficient to produce the other pharmacodynamic effects above referred to.

Hemicrania or migraine is defined as being a syndrome characterized by periodic, often one-sided headaches, which may last for hours or even days and are accompanied by nausea, vomiting and various sensory disturbances, such as amblyopia or other visual disturbances. It is generally assumed that migraine is caused by extra- or intra-cranial vascular spasms and a lowered pain threshold.

Migraine attacks are treated in different ways, depending largely upon the individual patient. In general, however, symptomatic relief has heretofore been obtained by administration of analgesics, sedatives, spasmolytics or anticonvulsives; in some cases the syndrome is treated with sympathomimetics, such as p-hydroxy-α-[(methylamino)-methyl]-benzyl alcohol tartrate (synephrine) or related compounds, with caffeine, or also by local external application of heat.

OBJECTS OF THE INVENTION

It is an object of the present invention to provide an effective therapeutic treatment for migraine in humans.

Another object of the instant invention is to provide a novel method of treating the migraine syndrome in humans.

A further object of this invention is to provide novel pharmaceutical compositions for the effective therapeutic treatment of migraine in humans.

Still other objects and advantages of the invention will become apparent as the description thereof proceeds.

THE INVENTION

We have discovered that the above objects and advantages are achieved by treating migraine with 2-(2',6'-dichlorophenyl-amino)-1,3-diazacyclopentene-(2) or a nontoxic, pharmaceutically acceptable acid addition salt addition salt thereof.

More particularly, we have unexpectedly discovered that the migraine syndrome is effectively suppressed and its recurrence prevented by administering to a patient suffering from migraine a substantially smaller single dose of 2-(2',6'-dichlorophenyl-amino)-1,3-diazacyclopentene-(2) or a non-toxic, pharmaceutically acceptable acid addition salt thereof than that required for achievement of a hypotensive effect, namely from 10 to 40 micrograms (0.166 to 0.67 micrograms/kg) preferably 20 to 30 micrograms (0.33 to 0.50 micrograms/kg). A single dose of 25 micrograms (0.417 micrograms/kg) for an average adult patient is particularly preferred. Of course, higher dosages may also be administered, especially if it is desired to produce hypotensive and sedative side-effects in addition to suppression of the migraine syndrome.

The efficacy of the migraine treatment according to the present invention was clinically ascertained on a group of seventeen adult human female patients suffering from severe, chronic migraine. The patients received three times daily perorally one tablet, containing 25 micrograms of 2-(2',6'-dichlorophenyl-amino)-1,3-diazacyclopentene-(2) hydrochloride, over a period of one month. In five of the patients a considerable improvement of their condition was achieved, and in the other 12 patients a degree of improvement was observed which had not been achieved by any previous method of treatment. Considered as a whole, the treatment according to the present invention produced a marked lessening of the susceptability to migraine attacks and a remarkable improvement in the overall well-being of the patients.

For therapeutic treatment of the migraine syndrome in humans, 2-(2',6'-dichlorophenyl-amino)-1,3-diazacyclopentene-(2) or a non-toxic acid addition salt thereof is administered perorally or parenterally to the afflicted patient as an active ingredient in customary pharmaceutical dosage unit compositions, that is, compositions in dosage unit form consisting essentially of an inert pharmaceutical carrier or excipient and one dosage unit of the active ingredient, such as tablets, coated pills, powders, capsules, solutions or the like. The pharmaceutical carrier component of such compositions may comprise the usual additives customarily used in the manufacture of pharmaceutical dosage unit compositions, such as disintegration promoters, binders, lubricants, sustained release agents and the like.

The following examples further illustrate the present invention and will enable others skilled in the art to understand it more completely; they represent the best mode contemplated of putting the invention to practical use, but it should be understood that the invention is not limited solely to these illustrative examples. The parts are parts by weight unless otherwise specified.

EXAMPLE 1

Tablets

The tablet composition was compounded from the following ingredients:

| | |
|---|---|
| 2-(2',6'-Dichlorophenyl-amino)-1,3-diazacyclopentene-(2) hydrochloride | 0.025 parts |
| Lactose | 54.975 parts |
| Corn starch | 20.0 parts |
| Soluble starch | 4.0 parts |
| Magnesium stearate | 1.0 parts |
| Total | 80.000 parts |

Compounding procedure:

The diazacyclopentene compound, the lactose and the corn starch were intimately admixed with each other, the mixture was granulated in customary fashion with the aid of an aqueous 10 percent solution of the soluble starch, the granulate was dried, and the dry granulate was admixed with the magnesium stearate. Thereafter, the finished composition was compressed into 80 mgm-tablets with the aid of a commercial tablet-making machine. Each tablet contained 25 micrograms of the diazacyclopentene compound and, when perorally administered to a human patient of about 60 kg body weight suffering from a migraine attack, effectively suppressed the migraine syndrome.

EXAMPLE 2

Drop Solution

The solution was compounded from the following ingredients:

| | | |
|---|---|---|
| 2-(2',6'-Dichlorophenyl-amino)-1,3-diazacyclopentene-(2) nitrate | | 2.00 parts |
| Methyl p-hydroxy-benzoate | | 0.07 parts |
| Propyl p-hydroxy-benzoate | | 0.03 parts |
| Demineralized water | q.s.ad | 100.000 parts by vol. |

Compounding Procedure:

The diazacyclopentene compound and the benzoates were dissolved in a sufficient amount of demineralized water, and the resulting solution was diluted to the indicated volume with additional demineralized water. 1 ml (about 20 drops) of the solution contained 20 micrograms of the diazacyclopentene compound and, when perorally administered to a human patient of about 60 kg body weight suffering from a migraine attack, effectively suppressed the migraine syndrome.

EXAMPLE 3

Hypodermic Solution

The solution was compounded from the following ingredients:

| | | |
|---|---|---|
| 2-(2',6'-Dichlorophenyl-amino)-1,3-diazacyclopentene-(2) nitrate | | 0.040 parts |
| Sodium chloride | | 18.0 parts |
| Distilled water | q.s.ad | 2000 parts by vol. |

Compounding procedure:

The diazacyclopentene compound and the sodium chloride were dissolved in a sufficient amount of distilled water, and the solution was diluted to the indicated volume with additional distilled water. The resulting solution was filtered until free from suspended matter, the filtrate was filled into 2 ml-ampules, and the ampules were sealed and sterilized for 20 minutes at 120° C. Each ampule contained 40 micrograms of the diazacyclopentene compound, and when the contents thereof were injected intramuscularly with a hypodermic syringe into a human patient of about 60 kg body weight suffering from a migraine attack, the migraine syndrome was effectively suppressed.

EXAMPLE 4

Powder

The powder composition was compounded from the following ingredients:

| | |
|---|---|
| 2-(2',6'-Dichlorophenyl-amino)-1,3-diazacyclopentene-(2) hydrochloride | 0.010 parts |
| Lactose | 499.990 parts |
| Total | 500.000 parts |

Compounding procedure:

The diazacyclopentene compound and a portion of the lactose were intimately admixed with each other, and then, while continuing the mixing, the remainder of the lactose was slowly added. 0.5 gm-portions of the finished powder composition were filled into aluminum foil envelopes of suitable size, which were then sealed. Each envelope contained 10 micrograms of the diazacyclopentene compound, and when the contents thereof were perorally administered to a human patient of about 60 kg body weight suffering from migraine, the migraine syndrome was effectively suppressed.

EXAMPLE 5

Granulate

The granulate composition was compounded from the following ingredients:

| | |
|---|---|
| 2-(2',6'-Dichlorophenyl-amino)-1,3-diazacyclopentene-(2) hydrochloride | 0.025 parts |
| Lactose | 499.975 parts |
| Total | 500.000 parts |

Compounding procedure:

The ingredients were intimately admixed with each other, as described in the preceding example, the mixture was moistened with distilled water and kneaded, the moist mass was granulated by forcing it through a fine-mesh screen, and the moist granulate was dried. 0.5 gm-portions of the dry granulate were filled into aluminum foil envelopes of suitable size, which were then sealed. Each envelope contained 25 micrograms of the diazacyclopentene compound, and when the contents thereof were perorally administered to a human patient of about 60 kg body weight suffering from a migraine attack, the migraine syndrome was effectively suppressed.

Analogous results were obtained when the free base form of 2-(2'6'-dichlorophenyl-amino)-1,3-diazacyclopentene-(2) or any other non-toxic acid addition salt thereof was substituted for the particular acid addition salt in illustrative Examples 1 to 5. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The method of alleviating the migraine syndrome in humans suffering from migraine, which comprises perorally or parenterally administering to said humans an effective dose of 2-(2',6'-dichlorophenyl-amino)-1,3-diazacyclopentene-(2) or a non-toxic, pharmaceutically acceptable acid addition salt thereof.

2. The method according to claim 1, wherein said dose is 0.166 to 0.67 micrograms per kilogram body weight.

3. The method according to claim 1, wherein said dose is 0.33 to 0.50 micrograms per kilogram body weight.

4. The method according to claim 1, wherein said dose is 0.417 micrograms per kilogram body weight.

* * * * *